Feb. 7, 1967   W. L. NEWCOMB   3,302,569
QUICK RELEASE SEPARATION MECHANISM

Filed Dec. 23, 1965   3 Sheets-Sheet 1

INVENTOR
WILLIAM L. NEWCOMB

BY

ATTORNEYS

Feb. 7, 1967 W. L. NEWCOMB 3,302,569
QUICK RELEASE SEPARATION MECHANISM
Filed Dec. 23, 1965 3 Sheets-Sheet 2
FIG. 2
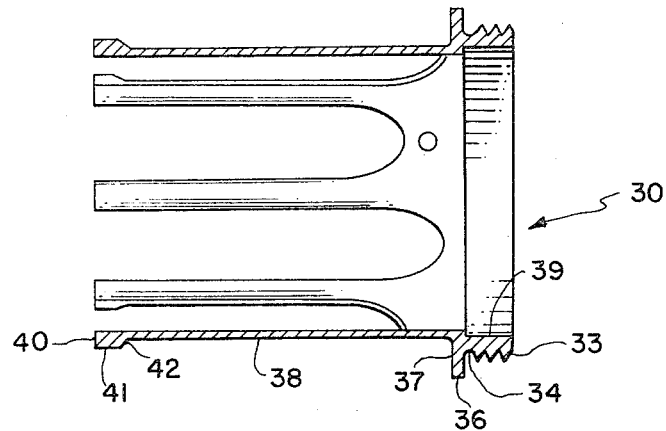
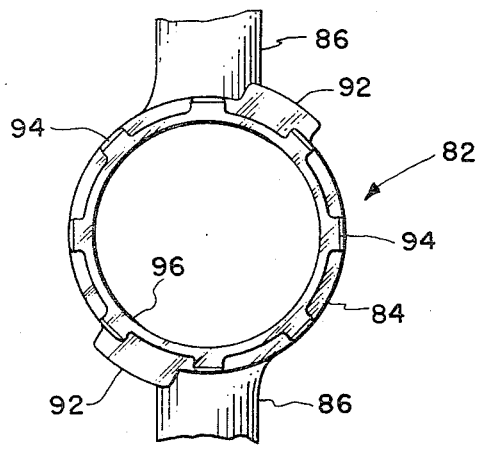
FIG. 4
INVENTOR
WILLIAM L. NEWCOMB
BY
ATTORNEYS Feb. 7, 1967 — W. L. NEWCOMB — 3,302,569
QUICK RELEASE SEPARATION MECHANISM
Filed Dec. 23, 1965 — 3 Sheets-Sheet 3

INVENTOR
WILLIAM L. NEWCOMB
BY
ATTORNEYS

United States Patent Office 3,302,569
Patented Feb. 7, 1967

1

3,302,569
QUICK RELEASE SEPARATION MECHANISM
William L. Newcomb, Rte. 1, Box 164,
Carrollton, Va. 23314
Filed Dec. 23, 1965, Ser. No. 516,151
10 Claims. (Cl. 102—49)

The invention described herein was made by an employee of the United States Government and may be manufactured and used by or for the Government for governmental purposes without the payment of any royalties thereon or therefor.

This invention relates generally to a connecter and more particularly to a quick release separation mechanism for the stages of an aerospace vehicle.

Various methods have been utilized previously for the connection and separation of the stages of rocket vehicles or missiles, as well as for the connection of rods and tubular elements such as lengths of pipe. For example, Marman bands, shaped charge cutting and blowout diaphragms have been utilized in the prior art for connection of two stages of a missile. These prior devices and methods have the distinct disadvantage of fragmentation with the attendant debris and damage resulting therefrom. Further, these known devices do not permit utilization of the central space nor do they permit a fail-safe redundancy as is available with the instant invention. Many elements, such as tubular members, have been connected by various mechanisms utilizing fingered members held in place during the connection and which are released to permit separation of the elements. Each of these prior art couplings requires a considerable amount of energy to be expended in either rotation of the connector or in release of the wedging mechanism that holds the fingered member in place. Such devices are wholly inadequate for coupling two elements to be separated by a signal from a remote location.

In order to overcome the disadvantages of the prior art, the instant invention contemplates the use of a releasing system responsive to a remote signal for slight rotation of a latch which permits the disengagement of a fingered member from a retainer member to permit a compressed spring to separate the two elements being connected.

It is an object of the instant invention to provide a safe, reliable, separation device capable of rigidly coupling stages of an aerospace vehicle.

Another object of this invention is to provide a mechanism that effects rigid coupling of a plurality of elements while permitting rapid and uniform separation of those elements at a predetermined signal.

A further object of this invention is to provide a separation device permitting quick release of a large tensile load by a small rotational force and movement.

A still further object of this invention is to provide a self-contained separation device wherein minimal rotation of a lockiing ring releases a tensile force to effect separation of the connected elements.

Still another object of the instant invention is to provide a quick release separation device for the stages of an aerospace vehicle or missile wherein pyrotechnic cutters operate with tensioning means to effect release of a latching member to permit disengagement of retainer and finger members by a compressed spring.

Generally, the foregoing and other objects are accomplished by connecting a fingered male member to one of the elements to be connected. A retainer member is secured to the other element to be connected and the fingered male member and the female retainer member are coupled to interfit with a locking ring position to retain them in mating engagement. A spring fits between portions of the fingered member and retainer member in a compressed

2 state and effects separation of the two elements when the locking ring is rotated slightly by spring members extending between the locking ring and the retainer member. These springs are held inoperable by a cable which is attached to the locking ring and extends to terminals on the retainer with a pyrotechnic cutter disposed in a manner that a signal thereto causes the cable to be cut to subject the locking ring to the rotating forces exerted by the springs. Rotation of the ring permits the fingered member to disengage the retainer because of the spring tension provided by the spring extending between the fingered member and the retainer member.

A more complete appreciation of the invention and many of the attendant advantages thereof will be readily apparent as the same becomes better understood by reference to the following description when considered in connection with the accompanying drawings wherein:

FIG. 2 is a cross-sectional view along the longitudinal axis of the fingered male member of the instant separation device;

FIG. 4 is a side elevational view of the latching member of the instant invention.

Figure 1:
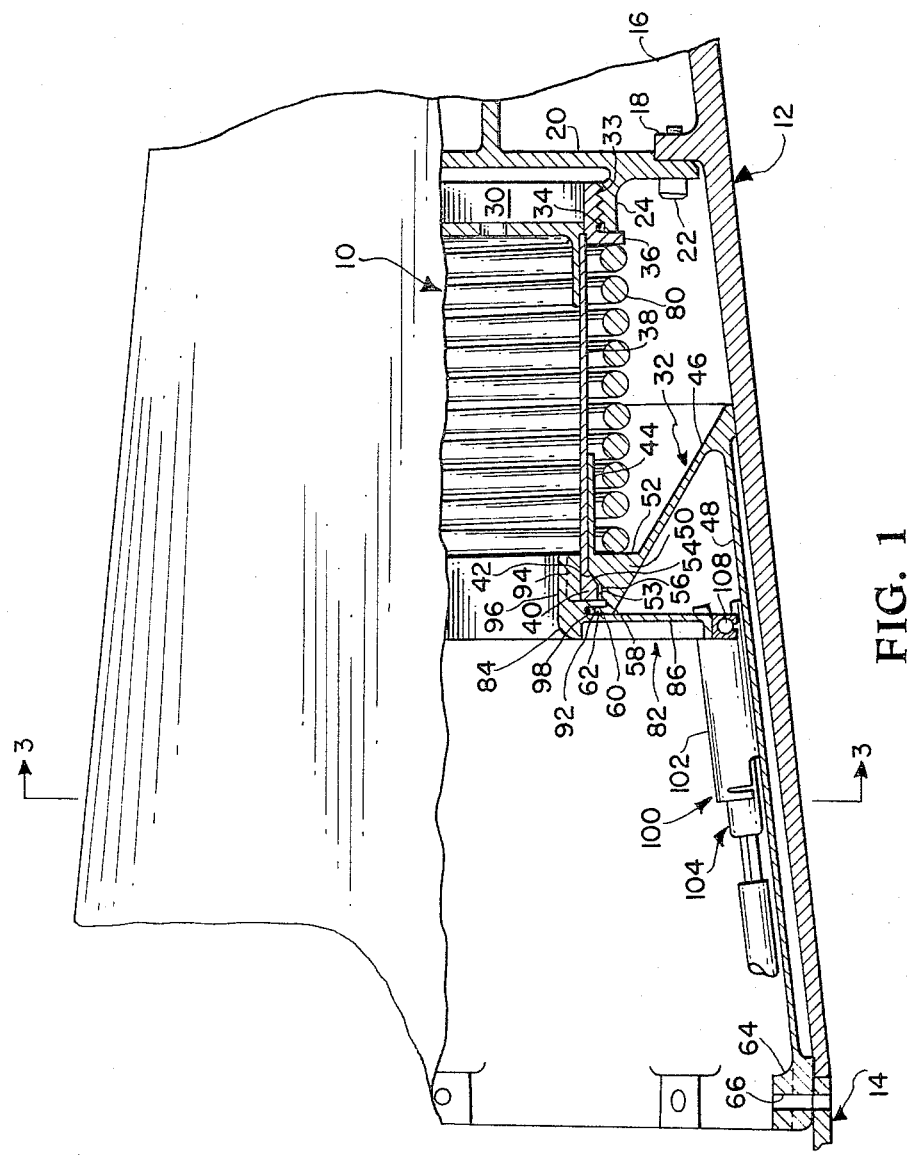
FIG. 1 is a partial section view taken along the longitudinal axis of the elements to be connected.

Referring now to the drawings and more particularly to FIG. 1, wherein the instant separation mechanism, generally designated by reference numberal 10, is shown in an assembled operable condition for connecting elements 12 and 14. For example, 12 may designate the forward section, stage or payload of an aerospace vehicle or missile and element 14 may designate the second stage of the vehicle. Element 12 is shown as including a hollow after section 16 having an inwardly directed flange 18 to which a rigid diaphragm or other structure 20 is connected by bolts 22. Rigid framework 20 includes a rearwardly extending internally threaded flange 24.

The instant inventive separation mechanism 10 generally includes male fingered element 30, female retainer member 32, and spring 80. Fingered male member 30, see FIG. 2, includes cylindrical, externally threaded body portion 33 for mating engagement with flange 24. Adjacent thread relief 34 on male member 30 is outwardly extending rim 36 for a purpose to be described more fully hereinafter. Fingers 38 are integral with body portion 33 and flange 36 and extend therefrom adjacent surface 37 with the opposite end of fingers 38 terminating in cam lugs 40 having flat bottom 41 and beveled face 42 which connects face 41 and the outer surface of finger 38. Channel 39 may be provided on the interior of body 33 for utilization in connection or location of other fixtures as is desired.

Female retainer member 32 is an annular member having a substantially reversed Z-shape in linear cross section, as best seen in FIG. 1. The interior or innermost leg 44 is joined to outermost leg 48 by crossbar 46. Innermost leg 44 connects with crossbar 46 with enlarged joiner portion 50 having surface 52 for a purpose to be described more fully hereinafter. The interior surface of leg 44 has recess 53 at the after end thereof and which includes angular or beveled surface 54 and flat bottom surface 56 for mating engagement with cam lug 40 to be described more fully hereinafter. Groove 58 in bottom 56 of recess 53 is separated from the rearmost surface 62 by spaced inwardly directed projections 60. Female retainer 32 is shown to include flange lugs 64 having bores 66 for rapid and easy installation and securement to element 14.

Figure 3:
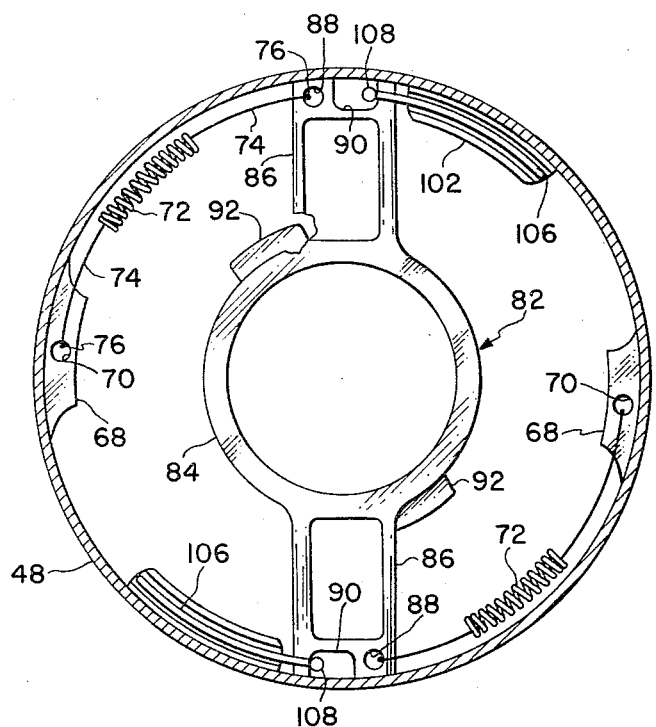
FIG. 3 is a partial sectional view, with portions omitted for clarity, taken on line 3—3 of FIG. 1.

Referring now to FIG. 3 wherein retainer 48 is shown to have brackets 68 mounted thereon in diametrically opposite positions. Bores 70 in brackets 68 receive the releasing mechanism which includes springs 72 having connector rods 74 with hooks 76 for engaging bores 70 and latch 82.

As best seen in FIGS. 1, 3 and 4, latch 82 includes locking ring 84 having a pair of radial arms 86 extending outwardly therefrom. The outer portion of arms 86 is provided with apertures 88 for receiving hooks 76 for connection of releasing spring 72. Arms 86 are also provided with slots 90 for a purpose to be described more fully hereinafter. A pair of radial wings 92 extend outwardly from locking ring 84 and are offset from arms 86 a sufficient distance to permit their insertion into groove 58 for locking behind spaced projections 60. As best seen in FIG. 1, locking ring 84 includes central flange 96 from which spaced radial bosses 94, equal in number to fingers 38, extend outwardly to lock cam lugs 40 in recess 53. Thus, it is seen that latch 82 is inserted with flange 96 between the fingers of male member 30 and wings 92 behind projections 60 which extend into space 98 between radial wings 92 and arms 86. At this point radial bosses 94 are between fingers 38 of male member 30. A slight rotation of latch 82 then causes radial wings 92 to lock in grooves 58 behind projections 60 and radial bosses 94 to be positioned behind fingers 38 and thereby lock cam lugs 40 in recess 53 with beveled faces 42 and 54 in contact.

Figure 5:
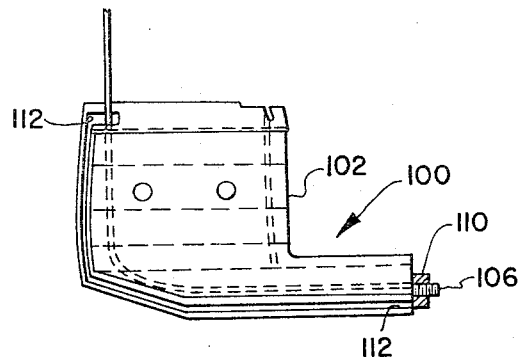
FIG. 5 is substantially a top view of the releasing member of the instant invention.

Referring now to FIGS. 1 and 5 wherein releasing mechanism 100 is shown to include turnbuckle terminal 102 any pyrotechnic reefing line cutters 104. Latching cable 106 has bead 108 which fits within slot 90 in radial arm 86. Latching cable 106 extends from slot 90 through cutters 104 to terminals 102 where nut 110 secures it in place to overcome the force of springs 72. Turnbuckle terminal 102 may be provided with groove 112 for accurately positioning and holding cable 106. Once cables 106 have securely positioned latch 82, to dispose bosses 94 behind cam lugs 40 and wings 92 in groove 58, springs 72 can be positioned with hooks 76 in bores 70 and 88. Thus, it is seen that springs 72 tend to rotate locking ring 84 counterclockwise as seen in FIG. 3, while cables 106 securely hold arms 86 to prevent any rotation due to terminals 102 being mounted on retainer 48.

As noted previously and as best seen in FIG. 1, helical spring 80 encircles fingers 38 of male member 30 and abuts surface 37 of rim 36 thereon. The other end of spring 80 abuts surface 52 of joiner 50 between innermost leg 44 and crossbar 46 of retainer 32. In the assembled position, as shown in FIG. 1, spring 80 has considerable compressive forces exerted thereon, but latch 82 prevents spring 80 from forcing female retainer 32 away from fingered member 30.

*Operation*

In the assembled condition shown in FIG. 1, separation device 10 rigidly secures and connects elements 12 and 14. A predetermined signal to pyrotechnic reefing line cutters 104 causes activation thereof and the consequential cutting of cables 106 which are then released and no longer are able to overcome the force of springs 72. Accordingly, springs 72 effect slight counterclockwise rotation of arms 86 and the attendant wings 92 and bosses 94. This slight rotation of latch 82 causes radial wings 92 and bosses 94 to respectively disengage groove 58 and cam lugs 40. With latch 82 and bosses 94 thereon no longer preventing inward movement of cam lugs 40 and fingers 38, spring 80 is permitted to extend to its full length and thereby causes separation of fingered member 30 and retainer member 32 because of beveled faces 42 and 54. Thus it is seen that elements 12 and 14 are quickly and uniformly separated without fragmentation of large structural members and thereby substantially reduce any debris or damage.

The above description of the operation of the instant invention is just one specific example to give a clear indication of the simple and reliable separation device. It is readily apparent that fail-safe redundancy may be accomplished by inclusion of a plurality of cutting elements as well as a plurality of springs at the various locations. The instant invention avoids fragmentation and any shrapnel or damage caused thereby, as well as substantially eliminating any space debris since the parts remain attached to parent structures. It is also apparent that the annular configuration of the instant separation mechanism permits utilization of the center space for various items, such for example as instrumentation, rocket motors or other propulsion devices, or fuel or electrical feed lines from after stage 14 to forward stage or payload 12.

Obviously, many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. In a quick release separation device the combination comprising: fingered means for securement to one element; retainer means adapted for securement to a second element to be releasably connected to said first element and to engage said fingered means; resilient means for disposal between said fingered and retainer means to effect separation of said elements; latching means for releasably securing said fingered means and retainer means together; and releasing means for operable attachment to said latching means, whereby a signal from a remote location activates said releasing means to effect movement of said latching means and thereby permit said resilient means to force said fingered and retainer means away from one another to effect separation of said elements.

2. The quick release separation device of claim 1 wherein said fingered means comprises: a plurality of fingers having cam lugs at one end thereof with the other ends terminating in a substantially cylindrical portion from which a rim extends radially outward.

3. The quick release separation device of claim 1 wherein said retainer means comprises: an annular member having a reversed substantially Z-shaped linear cross section; the interior surface of the innermost leg of said member having a recess with a beveled surface for engagement with said fingered means and a groove for releasable engagement with said latching means; and the surface between said innermost leg and the crossbar of said Z-shaped member adapted to receive one end of said resilient means.

4. The quick release separation device of claim 1 wherein said latching means comprises: a locking ring having a plurality of radial arms extending outwardly therefrom and adapted for connection to said releasing means; a plurality of radial wings extending outwardly from said locking ring, axially spaced from said arms and adapted to releasably engage said retainer means; a plurality of bosses extending radially outwardly from said locking ring; and each of said bosses adapted to engage said fingered means when the separation device is in an assembled operable condition.

5. The quick release separation device of claim 1 wherein said releasing means comprises: second resilient means adapted to engage said latching means and said retainer means; means for preventing movement of said latching means; and means responsive to a signal for releasing said means for preventing movement of said latching means.

6. The quick release separation device of claim 1 wherein said fingered means comprises: a substantially cylindrical body having a radial outwardly extending rim at one end; a plurality of spaced fingers extending from said body and being substantially planar therewith; each of said fingers terminating with a radially outwardly directed cam lug having an outer substantially planar face and a beveled face joining the outer face of said finger therewith; and said body externally threaded for mating engagement with said one element.

7. The quick release separation device of claim 6 wherein said retainer means comprises: an annular member of reversed substantial Z-shape; the innermost leg of said member being substantially cylindrical; a recess adjacent the end of the innermost leg formed with the crossbar; said recess having a substantially flat bottom and a beveled side for mating engagement with said cam lugs on said fingers; a groove in the bottom of said recess and spaced from the end thereof; said resilient means comprising a spring for disposal between said rim on said body and the surface joining said innermost leg and crossbar of said annular member; and the outermost leg of said annular member adapted for rigid attachment to said second element.

8. The quick release separation device of claim 7 wherein said latching means comprises: a substantially cylindrical locking ring having a plurality of radial arms extending outwardly therefrom adjacent one end thereof and adapted for connection to said releasing means; a plurality of radial wings extending outwardly from said locking ring, axially spaced from said arms and adapted to rotatably engage said groove in said recess in said annular member; a plurality of spaced bosses extending radially outward from said locking ring at the other end thereof; each of said bosses adapted to engage the inner face of one of said cam lugs to thereby lock said lugs in said recess in said annular member when the separation device is in an assembled operable condition.

9. The quick release separation device of claim 8 wherein said releasing means comprises: diametrically opposed brackets on the interior of the outermost leg of said annular member; unlocking spring means for rotating said locking ring and adapted to engage with said radial arms and said brackets; diametrically opposed turnbuckle terminals mounted on said outermost leg of said annular member; pyrotechnic reefing line cutters responsive to a signal disposed adjacent said turnbuckle terminals; latching cables adapted to engage each of said radial arms to prevent rotation of said locking ring; each of said cables passing through a respective cutter and secured to a respective turnbuckle terminal, whereby the signal activates said cutters to sever each of said cables and permit said unlocking spring means to rotate said locking ring thereby permitting said spring to cause separation of said fingers and said annular member and their associated elements.

10. In a quick release separation device for two stages of an aerospace vehicle the combination comprising: fingered means having a substantially cylindrical body with a radially outwardly extending rim at one end; a plurality of spaced fingers extending from said body and being substantially planar therewith; each of said fingers terminating with an outwardly directed cam lug having an outer substantially planar face and a beveled face joining the outer face of said finger therewith; said body externally threaded for engagement with the forward stage of the aerospace vehicle; an annular member of reversed substantial Z-shape in linear cross section; the innermost leg of said member being substantially cylindrical; a recess on the inner surface adjacent the end of the innermost leg which joins with the crossbar; said recess having a substantially flat bottom and beveled side engaging with the respective faces of said cam lugs on said fingers; a groove in said bottom of said recess and spaced from the end thereof; a helical spring disposed about said fingers and between said rim on said body and the surface joining said innermost leg and said crossbar of said annular member; the outermost leg of said annular member rigidly attached to the after stage of said aerospace vehicle; a substantially cylindrical locking ring having a pair of diametrically opposed radial arms extending outwardly therefrom adjacent one end thereof; a pair of diametrically opposed radial wings extending outwardly from said locking ring and axially spaced from said arms to rotatably engage said groove in said recess in said annular member; a plurality of spaced radial bosses equaling the number of said fingers extending outwardly from said locking ring at the other end thereof; each one of said bosses engaging the inner face of one of said cam lugs to thereby lock said lugs in said recess in said annular member; diametrically opposed brackets on the interior of said outermost leg of said annular member; unlocking spring means for rotating said locking ring and engaging said radial arms and said brackets; diametrically opposed turnbuckle terminals mounted on said outermost leg of said annular member; pyrotechnic reefing line cutters disposed adjacent said turnbuckle terminals and responsive to a signal; latching cables engaging each of said radial arms to prevent rotation of said locking ring; each of said cables passing through a respective cutter and secured to a respective turnbuckle terminal; whereby a signal activates said cutters to sever each of said cables and permit said unlocking spring means to rotate said locking ring to release said cam lugs from said recesses in said annular member to permit said helical spring to force said fingers and said annular member away from one another and thereby disconnect the stages of said aerospace vehicle.

References Cited by the Examiner
UNITED STATES PATENTS

| | | | |
|---|---|---|---|
| 3,070,015 | 12/1962 | Ledwith | 102—49 |
| 3,111,900 | 11/1963 | Fitton et al. | 102—49 |
| 3,174,706 | 3/1965 | Wagner | 102—49 |

References Cited by the Applicant
UNITED STATES PATENTS

| | | |
|---|---|---|
| 951,899 | 3/1910 | Teuer. |
| 2,360,485 | 10/1944 | Foster et al. |
| 2,784,987 | 3/1957 | Corcoran. |

SAMUEL FEINBERG, *Primary Examiner.*

V. R. PENDEGRASS, *Assistant Examiner.*